Patented Feb. 17, 1942

2,273,043

UNITED STATES PATENT OFFICE

2,273,043

TREATMENT OF HYDROCARBONS

Vladimir N. Ipatieff and Herman Pines, Chicago, Ill., assignors to Universal Oil Products Company, Chicago, Ill., a corporation of Delaware No Drawing. Application July 3, 1939, Serial No. 282,666

7 Claims. (Cl. 196—10)

This application is a continuation-in-part of application 145,569 filed 5–29–37, which is a continuation-in-part of application 140,164 (now Patent No. 2,112,847) filed 5–1–37, which is a continuation-in-part of application 103,389 filed 9–30–36, which is a continuation-in-part of application 35,235 filed 8–8–35.

This invention relates particularly to the treatment of paraffin hydrocarbons which are gaseous at ordinary temperatures and pressures, and particularly isobutane.

In a more specific sense, the invention is concerned with a novel process for alkylating isobutane with olefins which are normally gaseous to produce saturated hydrocarbons of higher molecular weight which can be utilized as constituents of motor fuel for automobile and aeroplane engines.

The cracking process which is operated principally with the object of producing gasoline from heavier and less valuable petroleum fractions incidentally produces considerable yields of fixed gases comprising hydrogen, methane, ethane, propane, and butanes as well as ethylene, propylene, and butylenes in varying quantities and proportion. In most instances, these gases are considered to have merely a fuel value though attempts are made from time to time to utilize the olefinic constituents for the manufacture of hydrocarbon derivatives on a commercial basis.

In one application of the present process the isobutane and propylene present in cracked gas mixtures are utilized as a source of additional yields of motor fuel fractions to augment those primarily produced by the cracking operation. While the process is particularly applicable to the utilization of the hydrocarbons in cracked gas mixtures, and particularly selected fractions produced therefrom in the stabilizers of cracking plants, it is also applicable to the treatment of isobutane and propylene produced from any other source.

In one specific embodiment the present invention comprises a process for the alkylation of isobutane with propylene to form substantial yields of alkylated products thereof, utilizing temperatures from 0 to approximately 150° C., superatmospheric pressures sufficient to maintain a substantial amount of liquid hydrocarbon phase in the reaction zone, and catalysts comprising aluminum chloride and hydrogen chloride.

The desired alkylation reactions may be activated or accelerated by the presence of small quantities of olefins more reactive than propylene which may be either added continuously during a run or used to treat the catalyst prior to its use in the alkylation reactions with propylene. This point will be developed in greater detail in a later portion of the specification.

As a basis for the present invention, it has been determined that in the alkylation of isobutane with propylene to form products of gasoline boiling range, temperatures above 0° C. may be employed without danger of polymerization reactions taking place instead of alkylation if sufficient pressure, such as 5 to 50 atmospheres, is imposed upon the reaction zone to maintain a substantial amount of liquid phase at all times and if a considerable excess of the isobutane is present, preferably 3 or more mols to 1 mol of propylene. As will be indicated in experimental data in a later section, the temperature of the reaction can be safely raised to 100° C. without material sacrifice of gasoline boiling range material although there is some diminution in the yields of heptanes corresponding to products of primary alkylation reactions if temperatures of over 50° C. are employed. The use of elevated temperatures along with superatmospheric pressures is accompanied by an increase in the rate of the reactions and an increase in the capacity of commercial equipment so that when the main object of the alkylation reactions is the production of high antiknock gasoline boiling range material, the present type of operation is preferable over the use of temperatures below 0° C. without imposed pressure, though the lower temperature type of operation may produce somewhat higher yields of the products of simple alkylation reactions.

The total reactions occurring when isobutane is alkylated with propylene within the approximate range of conditions specified will necessarily involve to some extent not only simple alkylation corresponding to the addition of one or more molecules of the olefin to the isoparaffin but also some reactions of polymerization and some reactions of decomposition, so that the net result is the production of a mixture of hydrocarbons having a considerable boiling range but containing a large proportion of mono- and dialkylated products. The reactions of polymerization are usually of a negligible order when a moderate excess of isoparaffin is present in the reaction zone.

The actual operation of the process admits of some modification depending upon whether batch or continuous operations are employed. In batch operation wherein substantially only isobutane and propylene are concerned, the paraffin is maintained under liquid phase by the application of sufficient pressure at the temperature chosen for the treatment, finely divided anhydrous aluminum chloride is maintained in suspension by mechanical agitation or rotation of the pressure vessel containing originally the isobutane and aluminum chloride and alkylation is effected by the gradual introduction of propylene and a small amount of hydrogen chloride under the surface of the liquid. The hydrogen chloride is preferably used in the amount of about 1 to 10% by weight of the aluminum chloride. For effecting rapid and complete alkylation, it is advantageous to add concurrently a small percentage of a more reactive olefin such as, for example, isobutylene or normal butylenes. After a treatment is completed the aluminum chloride layer is allowed to settle, the reaction vessel is cooled, and the pressure released, and the upper hydrocarbon layer is removed by decantation and subjected to fractionation for the removal of uncombined hydrocarbons as a light overhead and the recovery of the desired motor fuel fraction.

In continuous operation isobutane containing suspended therein the requisite amount of aluminum chloride may be pumped through a tubular treater at the entrance to which it receives the necessary addition of propylene and hydrogen chloride, the desired alkylation taking place during passage through the treater and the fractionation of the products being accomplished in a subsequent fractionator. The proportions of isobutane and propylene are regulated at the entrance of such treaters so that the requisite excess of the iso-paraffin is maintained at all times. The details of continuous processes of this general character are more or less familiar to those skilled in oil refinery operations and any necessary addition to or modifications of the above general procedures will be more or less obvious, and can be made without departing from the general scope of the invention.

The preliminary activation of the alkylation reaction may be effected by treating the granular aluminum chloride intended for use in the reactions with either normal or isobutylenes by passing a limited amount of these compounds in liquid-phase in contact with the granular material during vigorous agitation. The pronounced effect of this activation upon the speed of subsequent alkylation reactions with propylene is somewhat difficult to explain on a theoretical basis though it may be suggested that intermediate addition compounds are formed which are the real catalysts of the reaction in the presence of the hydrogen chloride which is continuously added. It is further possible that a certain amount of more reactive olefin which is combined with the aluminum chloride tends to alkylate the isobutane and evolve considerable energy of reaction which has the effect of energizing the less reactive propylene. It has been observed that the activating effect is gradually lost so that in a strict sense it is not entirely catalytic. This feature of the present process is important from a practical standpoint since, when using pure propylene or at least propylene free from other olefins, the speed of the alkylation reactions is sometimes below a practical level within the lower range of temperatures. The preliminary treatment of granular aluminum chloride with relatively highly reactive olefins, such as isobutylenes, has been observed to have a still further effect of practical significance, in that there is a greatly decreased tendency for the chloride particles to become very finely divided under vigorous agitation but rather to maintain their original size, which obviously prevents loss of contact surface and assists in maintaining the catalyst activity and the reaction rate.

The reacting hydrocarbons required for the present process may be obtained from any convenient source. As a rule the best sources are the cracked gas mixtures produced in the pyrolysis of heavy oils with the primary object of producing gasoline. The technique of hydrocarbon fractionation is sufficiently developed at the present time so that it is commercially feasible to produce relatively pure propylene and isobutane. A method which may be employed to obtain propylene which is not contaminated with paraffin hydrocarbons consists in the use of solvents which selectively abstract olefins from the gas mixtures, which olefins are then separately fractionated. In such a process the residual unabsorbed paraffin mixture may be also prepared by the selective catalytic dehydrogenation of propane or propane fractions.

In the presence of an excess of about 3 mols of isobutane, one molecule of propylene tends to react with its molecular equivalent of isobutane while the excess of isobutane remains unaffected. When more propylene is used than corresponds to about one mole of propylene to three moles of isobutane there is an increased tendency for polymerization reactions to occur in preference to alkylation reactions. This is to be expected to some extent on account of the readiness with which propylene alone is polymerized by aluminum chloride. However, by maintaining the proper excess of the paraffin hydrocarbon the course of the reactions may be kept principally in the direction of production of alkylated products of a saturated rather than an olefinic character. In order to balance up any disproportion on the side of either the olefin or the paraffin, to produce products of the desired degree of alkylation either may be added from outside sources to produce a mixture of proper proportions. It will be shown in subsequent examples that there is some production of isodecanes as well as isoheptanes, the former compounds corresponding to alkylation of isobutane by two isopropyl groups.

The following tabulation of experimental data is given as illustrative of the type of results normally obtainable by the use of the present process, although it is not given with the intention of limiting the scope of the invention in exact conformity with the data presented.

The tabulation shows the results of experiments in the alkylation of isobutane with propylene at temperatures from +10 to +150° C. under pressures sufficient to maintain a large proportion of liquid phase present in the reaction zone. The isobutane and aluminum chloride were charged to a pressure vessel maintained at the desired reaction temperature by an oil bath and the propylene and hydrogen chloride were gradually introduced during the time shown as the duration of the run. At the completion of the reactions the pressure vessel was cooled and the products recovered and fractionated.

|  | Run | | | |
|---|---|---|---|---|
|  | 1 | 2 | 3 | 4 |
| Charge: | | | | |
| i-C$_4$H$_{10}$ _____ parts by weight__ | 336 | 336 | 330 | 159 |
| AlCl$_3$_____ | 25 | 25 | 30 | 30 |
| HCl_____ | 14.5 | 8.5 | 5 | 0 |
| C$_3$H$_6$_____ | 104 | 104 | 104 | 70 |
| Duration of run_____hours__ | 2.5 | 1.0 | 1.1 | 1.0 |
| Temperature_____°C__ | 10-15 | 45 | 100 | 150 |
| Pressure_____atmospheres__ | 4-5 | 6.8 | 20 | _____ |
| Products, parts by weight: | | | | |
| Upper hydrocarbon layer_____ | 165 | 153 | 144 | 87 |
| Lower layer, spent catalyst_____ | 39.5 | 40 | 46 | 46 |
| Distillation of upper layer: | | | | |
| 25-45° C_____ | 19.4 | 14.5 | 31.2 | 42.7 |
| 45-75_____ | 11.7 | 8.9 | 13.1 | 11.8 |
| 75-100 (heptanes)_____ | 32.4 | 38.1 | 11.2 | 9.3 |
| 100-125_____ | 13.1 | 9.5 | 15.4 | 10.7 |
| 125-150_____ | 6.8 | 7.1 | 8.5 | 4.9 |
| 150-175_____ | ____ | 6.3 | 4.2 | 3.9 |
| 175-200_____ | ____ | 3.6 | 4.2 | 2.7 |
| to 225 Total_____ | 83.4 | 88.0 | 90.4 | 88.6 |

The foregoing data show that up to about 50° C. there is an optimum production of heptanes indicating a maximum of primary alkylation reactions between isobutane and propylene, beyond this point the production of heptanes decreases sharply so that at 100° C. 11.2% is produced as compared with 38.1% at 45° C. With the decrease in production of primary alkylated products there is an increase in lower boiling products. The total liquid hydrocarbon layer also decreased markedly above 100° C. so that from the standpoint of gasoline production this temperature is considerably too high.

The nature and practical aspects of the present invention are obvious from the preceding specification and numerical data although neither section is intended to unduly limit its scope.

We claim as our invention:

1. A process for the alkylation of isobutane with propene which comprises subjecting a hydrocarbon mixture containing propene and a quantity of isobutane in excess of that of the propene to the action of aluminum chloride and hydrogen chloride at an alkylating temperature above 0° C. and under sufficient superatmospheric pressure to maintain a substantial portion of the isobutane in liquid phase.

2. The process as defined in claim 1 further characterized in that the molal excess of isobutane to propene in said hydrocarbon mixture is approximately 3 to 1.

3. The process as defined in claim 1 further characterized in that said pressure is in the approximate range of 5 to 50 atmospheres.

4. The process as defined in claim 1 further characterized in that the molal excess of isobutane to propene in said hydrocarbon mixture is approximately 3 to 1 and said pressure is in the approximate range of 5 to 50 atmospheres.

5. The process as defined in claim 1 further characterized in that the hydrogen chloride is present in the amount of about 1 to 10% by weight of the aluminum chloride.

6. The process as defined in claim 1 further characterized in that the alkylation is effected in the presence of a minor proportion of an olefin more reactive than propene.

7. An alkylation process which comprises reacting propene with isobutane in the presence of aluminum chloride and hydrogen chloride at an alkylating temperature above 0° C. and under sufficient pressure to maintain a substantial portion of the isobutane in liquid phase.

VLADIMIR N. IPATIEFF.
HERMAN PINES.